United States Patent
Lee et al.

(10) Patent No.: US 11,079,011 B2
(45) Date of Patent: Aug. 3, 2021

(54) VEHICLE CONTROL SYSTEM AND METHOD ON LOW FRICTION ROAD

(71) Applicant: Hyundai Kefico Corporation, Gunpo-si (KR)

(72) Inventors: John Ha Lee, Suwon-si (KR); Nam Hoon Kim, Suwon-si (KR); Se Hoon Son, Yongin-si (KR); Seo Yeon Cho, Seongnam-si (KR)

(73) Assignee: HYUNDAI KEFICO CORPORATION, Gunpo-si (KR)

( * ) Notice: Subject to any disclaimer, the term of this patent is extended or adjusted under 35 U.S.C. 154(b) by 23 days.

(21) Appl. No.: 16/668,293

(22) Filed: Oct. 30, 2019

(65) Prior Publication Data

US 2020/0141485 A1 May 7, 2020

(30) Foreign Application Priority Data

Nov. 2, 2018 (KR) .................. 10-2018-0133364

(51) Int. Cl.
*F16H 61/16* (2006.01)
*B60W 30/19* (2012.01)
(Continued)

(52) U.S. Cl.
CPC .............. *F16H 61/16* (2013.01); *B60W 30/19* (2013.01); *B60W 40/068* (2013.01);
(Continued)

(58) Field of Classification Search
CPC .......... F16H 61/16; F16H 59/66; F16H 61/10; F16H 2061/161; F16H 59/48;
(Continued)

(56) References Cited

U.S. PATENT DOCUMENTS

2017/0015321 A1* 1/2017 Nakadori ............... B60W 10/11
2017/0043779 A1* 2/2017 Yoon .................... B60W 10/11
(Continued)

FOREIGN PATENT DOCUMENTS

| JP | H09-249050 A | 9/1997 |
|---|---|---|
| JP | 2003-311123 A | 11/2003 |
| JP | 2005-076846 A | 3/2005 |
| JP | 2005-226671 A | 8/2005 |
| JP | 2006-220235 A | 8/2006 |
| KR | 10-1996-0040788 A | 12/1996 |
| KR | 10-2018-0062780 | 6/2018 |

OTHER PUBLICATIONS

English Translation of KR20180062780A; http://translationportal.epo.org; Jan. 8, 2021 (Year: 2021).*

*Primary Examiner* — Roger L Pang
(74) *Attorney, Agent, or Firm* — Brinks Gilson & Lione

(57) ABSTRACT

A vehicle control system and a method for a vehicle running on a low friction road inhibit repetitive gear shifts of a transmission of the vehicle. The vehicle control system of the vehicle includes: one or more sensors for sensing an engine speed of the vehicle, an engine oil temperature, a position of an accelerator pedal, a lateral acceleration of the vehicle, a rotational angle of a steering wheel, or whether a low friction road running mode switch is turned on or off; and a controller for receiving sensor data from the sensors. In particular, the controller determines whether the vehicle satisfies an entry condition for performing a repetitive shift prevention control based on the sensor data, and controls a gear shift of the transmission and an engine torque to inhibit the repetitive gear shifts of the vehicle when the downshift occurs when the vehicle has satisfied the entry condition.

11 Claims, 4 Drawing Sheets

(51) Int. Cl.
*B60W 40/068* (2012.01)
*F16H 59/66* (2006.01)
*F16H 61/10* (2006.01)

(52) U.S. Cl.
CPC ............ *F16H 59/66* (2013.01); *F16H 61/10* (2013.01); *F16H 2061/161* (2013.01)

(58) Field of Classification Search
CPC .......... F16H 59/18; F16H 59/78; F16H 59/36; F16H 59/14; F16H 2059/366; B60W 30/19; B60W 40/068; B60W 2510/0676; B60W 2540/18; B60W 2540/10; B60W 2552/40; B60W 2520/128; B60W 50/06; B60W 10/11; B60W 30/18172; B60W 2510/0604; B60W 10/10; B60W 40/06; B60W 40/109
USPC .............................................. 701/57, 62, 82
See application file for complete search history.

(56) References Cited

U.S. PATENT DOCUMENTS

| | | | |
|---|---|---|---|
| 2018/0178776 A1* | 6/2018 | Kuwahara | B60K 6/48 |
| 2018/0312156 A1* | 11/2018 | Yoon | B60K 6/48 |
| 2020/0039500 A1* | 2/2020 | Lim | B60W 20/15 |
| 2020/0164876 A1* | 5/2020 | Tokura | B60W 10/06 |

* cited by examiner

VEHICLE CONTROL SYSTEM AND METHOD ON LOW FRICTION ROAD

CROSS-REFERENCE TO RELATED APPLICATION

This application claims priority to and the benefit of Korean Patent Application No. 10-2018-0133364, filed on Nov. 2, 2018, the entire contents of which are incorporated herein by reference.

FIELD

The present disclosure relates to a vehicle control system and method on a low friction road.

BACKGROUND

The statements in this section merely provide background information related to the present disclosure and may not constitute prior art.

When a vehicle runs on a low friction road such as snow, sand, or muddy roads, the vehicle may slip while driving on such a road and lead to a car accident, such that most automatic transmission vehicles are provided with an Electronic Stability Program (ESP) to secure the driver's safety.

The ESP is a means for controlling an anti-lock brake system (ABS) and a Traction Control System (TCS) integrally to prevent the vehicle from sliding to the left or the right with respect to the running direction, thereby securing the operating stability of the vehicle, in particular, the ESP may prevent the sliding of the vehicle by analyzing the state of a steering wheel to compare a direction in which the driver intends to go with an actual proceeding direction of the vehicle, and adjusting the proceeding direction of the vehicle if the comparison result indicates that the driver's intended direction does not coincide with the actual proceeding direction of the vehicle.

In particular, the ESP continuously checks the steering wheel operation by the driver to sense whether the driver is in danger, drops the engine torque if a danger is sensed, and controls an automatic transmission (e.g., shifting gear stages) to modify the running state of the vehicle.

We have discovered that when the vehicle is running on a low friction road, repetitive gear shifts, which are not intended by the driver, may occur due to the engine torque control and gear shift control performed by the ESP, resulting in possible damage to the transmission.

More specifically, if the wheel slip occurs while the vehicle is running on the low friction road, a wheel locking phenomenon occurs due to the operation of the ESP, thereby significantly reducing a vehicle speed to perform the downshift of the transmission.

We have found that after the downshift has been performed as described above, if the operation of the ESP is released, the upshift is performed while the vehicle speed increases again, and if the wheel slip of the vehicle occurs once again after the upshift, the downshift is performed by the operation of the ESP, such that if the vehicle is running on the low friction road, the unintentional shifts have been inevitably repeated, and there has been a problem in that the unintentional repetitive shifts may cause overheating of the transmission, shift shock, and transmission clutch burning, thereby resulting in the breakdown of the vehicle.

SUMMARY

The present disclosure provides a vehicle control system and method, which may control a transmission to inhibit or prohibit a gear change, and control an engine to limit an engine torque, thereby inhibiting or preventing the repetitive shifts, not intended by a driver, that may occur while a vehicle is running on a low friction road.

The technical object to be achieved by the present disclosure is not limited to the technical object mentioned above, and other technical objects not mentioned above are clearly understood by those skilled in the art to which the present disclosure pertains from the following description.

In one form of the present disclosure, a vehicle control system for inhibiting the repetitive gear shifts while a vehicle is running on a low friction road may include: one or more sensors configured to detect an engine speed of the vehicle, a temperature of an engine oil, a position of an accelerator pedal, a lateral acceleration of the vehicle, a rotational angle of a steering wheel, or whether a low friction road running mode switch is turned on or off, and a controller. In particular, the controller receives detected data from the one or more sensors, determines whether the vehicle satisfies an entry condition for performing a repetitive shift prevention control based on the received data, and controls a gear shift of a transmission and an engine torque of the vehicle to perform the repetitive shift prevention control when a downshift occurs in a state where the vehicle has satisfied the entry condition.

In one form, the one or more sensors may include an oil temperature sensor for detecting the temperature of the engine oil, an accelerator position sensor for detecting the position of the accelerator pedal, a steering angle sensor for detecting the rotational angle of the steering wheel, an acceleration sensor for detecting the lateral acceleration of the vehicle, and an engine speed sensor for detecting the engine speed of the vehicle.

In another form, the controller includes: an entry condition determinator for determining whether the vehicle has satisfied the entry condition for performing the repetitive shift prevention control or whether the entry condition has been released during the running of the vehicle based on the data received from the one or more sensors; a shift controller for inhibiting the gear shift of the transmission when the downshift occurs, after it has been determined that the entry condition has been satisfied by the entry condition determinator; and an engine torque controller for requesting an engine torque limitation when the downshift occurs, after it has been determined that the entry condition has been satisfied by the entry condition determinator.

In particular, the entry condition determinator determines that the vehicle has satisfied the entry condition when: the low friction road running mode switch has been in the ON state, a signal delivered from the one or more sensors is a normal signal, the engine speed is equal to or greater than a predetermined first setting value, the temperature of the engine oil is equal to or greater than a predetermined second setting value, the position of the accelerator pedal is equal to or greater than a predetermined third setting value, and the rotational angle of the steering wheel is equal to or greater than a fourth setting value.

In another form, the controller further includes a low friction road running determinator for determining whether the vehicle has escaped the low friction road based on a value of the lateral acceleration of the vehicle, and the low friction road running determinator determines that the vehicle has escaped the low friction road when the lateral acceleration value is greater than a predetermined fifth setting value.

Further, the controller determines whether the downshift occurs only when it is determined that the vehicle has not escaped the low friction road by the low friction road running determinator, and controls the gear shift of the transmission and the engine torque when the downshift has occurred.

Here, the shift controller inhibits the gear shift of the transmission so that a current gear may be maintained during a predetermined time, when the entry condition determinator determines that the entry condition has been released during the running of the vehicle.

In other form, the engine torque controller controls the engine torque to increase with a constant slope during a predetermined time when the entry condition has been released during the running of the vehicle.

In other form of the present disclosure, a vehicle control method for inhibiting repetitive gear shifts of a vehicle while running on a low friction road includes: collecting, by at least one sensor, data of the vehicle including at least one of an engine speed of the vehicle, a temperature of an engine oil, a position of an accelerator pedal, a lateral acceleration of the vehicle, a rotational angle of a steering wheel, or ON/OFF data of a low friction road running mode switch; determining, by a controller, whether the vehicle satisfies an entry condition for performing a repetitive shift prevention control or whether the entry condition has been released during the running of the vehicle based on the collected data; controlling a gear shift of a transmission of the vehicle when a downshift occurs after it has been determined that the entry condition has been satisfied; and controlling, by the controller, an engine to limit an engine torque when the downshift occurs, after it has been determined that the entry condition has been satisfied.

In other form, the vehicle control method may further include: prior to controlling the gear shift of the transmission or the engine torque, determining, by the controller, whether the vehicle has escaped the low friction road based on the lateral acceleration data of the vehicle.

In particular, it is determined that the vehicle has escaped the low friction road when the lateral acceleration value of the vehicle is greater than a predetermined setting value.

In other form, the vehicle control method may further include: when the entry condition has been released during the running of the vehicle, inhibiting the gear shift of the transmission so that a current gear may be maintained during a predetermined time, or controlling the engine torque to increase with a constant slope during a predetermined time.

The vehicle control system and method of the present disclosure may inhibit or prevent the unintentional repetitive gear shifts caused by the wheel slip and the wheel locking while the vehicle is running on the low friction road, resulting in reducing or minimizing the overheating and the shock applied to the transmission.

Further, the present disclosure may provide the vehicle control system and method for the vehicle to effectively escape the low friction road, thereby enhancing the operating performance of the vehicle.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

Figure 1:
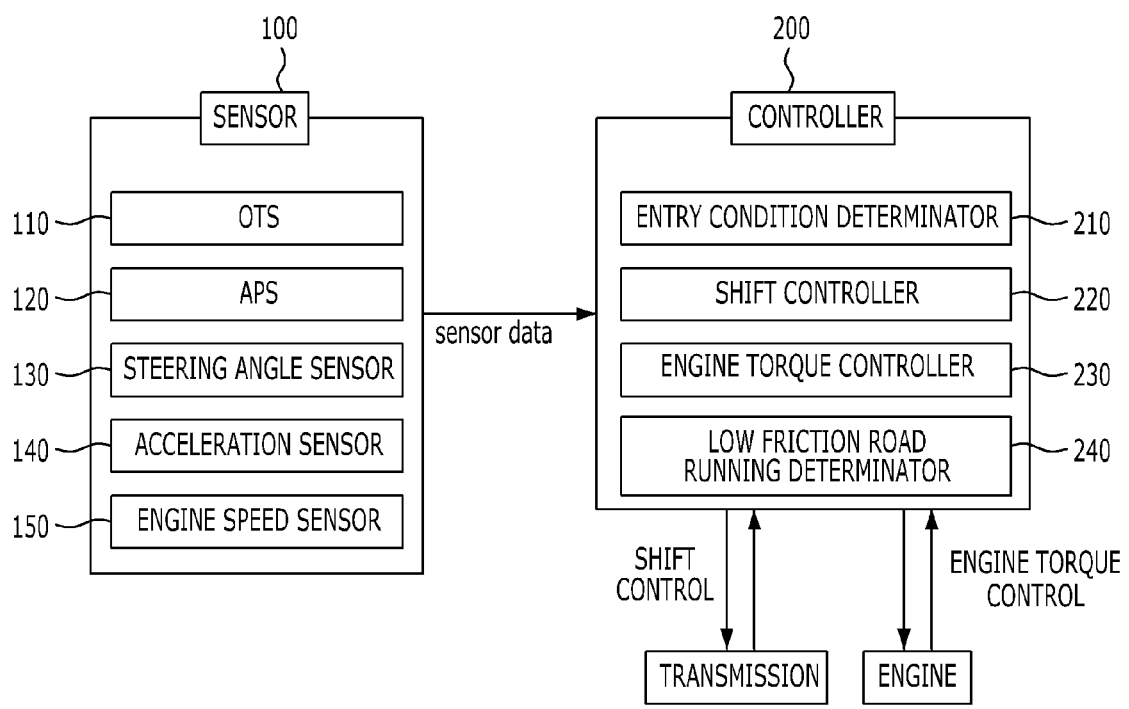
FIG. 1 is a conceptual diagram of a vehicle control system.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, the present disclosure will be described with reference to the drawings in more detail. Further, detailed descriptions of well-known functions and configurations that may unnecessarily obscure the gist of the present disclosure will be omitted.

It should be understood that when a component is referred to as being connected or coupled to another component, it may be directly connected or coupled to another component, but other components may be present therebetween. Further, when a member is positioned "on" another member throughout the present specification, this includes not only when the member contacts another member but also when other members are present between two members.

In the present application, it should be understood that the terms "comprises" or "having", or the like refer to the presence of features, integers, steps, operations, components, parts, or combinations thereof described in the specification, but do not preclude the presence or addition possibility of one or more other features, integers, steps, operations, components, parts, or combinations thereof.

First, a vehicle control system on a low friction road according to an embodiment of the present disclosure will be described in detail with reference to FIGS. 1 to 3.

Figure 2:
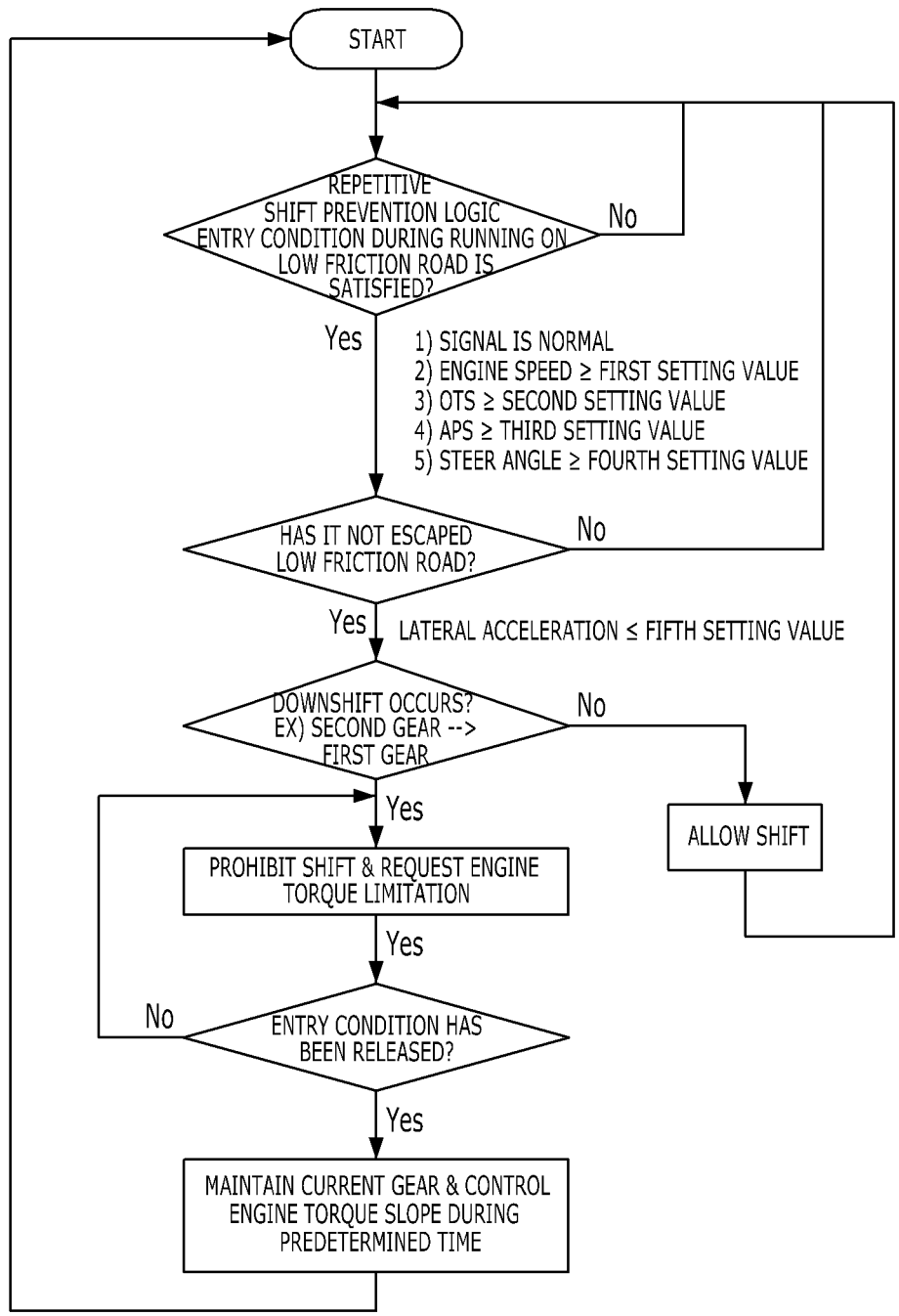
FIG. 2 is a flowchart illustrating a control method for inhibiting repetitive gear shifts of a vehicle by a vehicle control system.
Figure 3:
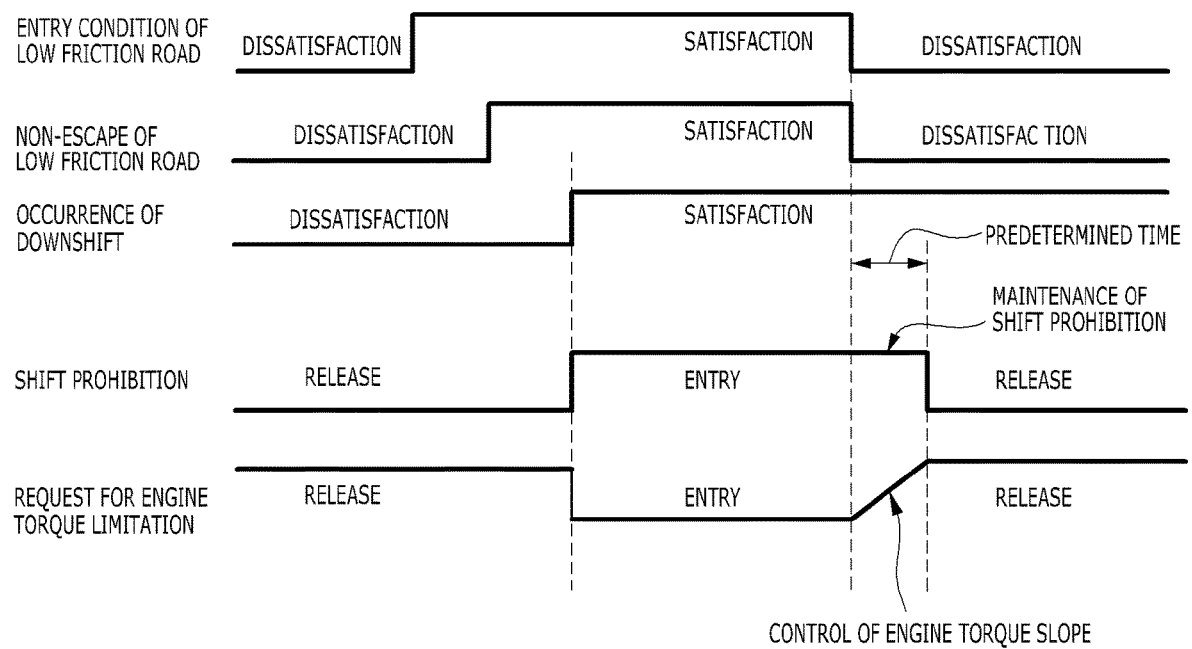
FIG. 3 are graphs to illustrate a process of inhibiting the repetitive gear shifts of the vehicle by the vehicle control system in a low friction road condition.

FIG. 1 is a conceptual diagram of a vehicle control system according to an embodiment of the present disclosure, FIG. 2 is a flowchart illustrating a process of inhibiting repetitive gear shifts of a vehicle on a low friction road by the vehicle control system according to an embodiment of the present disclosure, and FIG. 3 are graphs for explaining a process of inhibiting the repetitive gear shifts of the vehicle on the low friction road by the vehicle control system according to an embodiment of the present disclosure.

The present disclosure provides a vehicle control system that inhibits or prevents repetitive gear shifts that occur regardless of the driver's intention while the vehicle is running on the low friction road. In one form, the vehicle control system of the vehicle may include: a sensor 100 for sensing an engine speed of the vehicle, an engine oil temperature, a position of an accelerator pedal, a lateral acceleration of the vehicle, a rotational angle of a steering wheel, or whether a low friction road running mode switch is turned ON/OFF, and a controller 200 for receiving sensor data from the sensor 100, confirming whether the vehicle satisfies an entry condition for performing a repetitive shift prevention control based on the sensor data, and controlling the gear shift of a transmission of the vehicle and the engine torque to inhibit or prevent the repetitive gear shifts of the vehicle if the downshift occurs in a state where it has been confirmed that the vehicle has satisfied the entry condition.

As described above, the vehicle control system of the present disclosure is different from the conventional vehicle control system in that it is possible to prevent the repetitive shift by an ESP that may occur while the vehicle is running on the low friction road through the shift and engine torque control, and it is possible to allow the vehicle to escape the low friction road more efficiently.

Hereinafter, the components of the vehicle control system of the present disclosure will be described in more detail.

First, the sensor 100 includes an oil temperature sensor (OTS) 110 for sensing the engine oil temperature, an accelerator position sensor (APS) 120 for sensing the position of the accelerator pedal, a steering angle sensor 130 for sensing the rotational angle of the steering wheel, an acceleration sensor 140 for sensing the lateral acceleration of the vehicle, and an engine speed sensor 150 for sensing the rotational speed of the engine, and serves as collecting data desired for performing a control for preventing the repetitive gear shift of the vehicle.

In particular, the sensor 100 may collect sensor data such as i) the engine speed of the vehicle, ii) the engine oil temperature, iii) the position of the accelerator pedal, iv) the lateral acceleration of the vehicle, and v) the rotational angle of the steering wheel, which are a reference of determining whether the vehicle satisfies the entry condition for performing the control of preventing the repetitive shift and whether the vehicle escapes the low friction road to be described later through the sensors, and the collected sensor data may be transmitted to the controller 200 to be used for controlling the vehicle.

Further, the vehicle control system of the present disclosure may determine whether the vehicle is running on the low friction road through the low friction road running mode switch operation of the driver, and the sensor 100 may not only collect the sensor data, but also sense whether the low friction road running mode switch is turned ON/OFF, and transmit data on whether the low friction road running mode switch is turned ON/OFF to the controller 200, thereby allowing the controller 200 to confirm whether the vehicle is currently running on the low friction road.

At this time, the type of the sensor data collected by the sensor 100 is merely an embodiment, and it is natural that other sensor data other than the engine speed of the vehicle, the engine oil temperature, the position of the accelerator pedal, the lateral acceleration of the vehicle, and the rotational angle of the steering wheel described above may also be collected in the sensor 100.

Next, the controller 200 serves as controlling the transmission and the engine based on the sensor data such as i) the engine speed of the vehicle, ii) the engine oil temperature, iii) the position of the accelerator pedal, iv) the lateral acceleration of the vehicle, and v) the rotational angle of the steering wheel, which have been received from the sensor 100, and the data on whether the low friction road running mode switch is turned ON/OFF, thereby preventing the repetitive shift not intended by the driver from occurring.

In particular, the controller 200 may include an entry condition determinator 210, a shift controller 220, and an engine torque controller 230, thereby preventing the repetitive shift not intended by the driver during the running on the low friction road from occurring.

Specifically reviewing the components of the controller 200, the entry condition determinator 210 first serves as determining whether the vehicle has satisfied the entry condition for performing the repetitive shift prevention control or whether the entry condition has been released during the running of the vehicle based on the sensor data received from the sensor 100.

At this time, the entry condition for performing the repetitive shift prevention control means a condition for performing the shift prohibition and the engine torque limit control to be described later, and the entry condition determinator 210 determines that the vehicle has satisfied the entry condition for performing the repetitive shift prevention control if it is confirmed in the sensor that the low friction road running mode switch has been in the ON state, i) a signal delivered from the sensor is a normal signal, ii) the engine speed value is a predetermined first setting value or more, iii) the engine oil temperature is a predetermined second setting value or more, iv) the position of the accelerator pedal is a predetermined third setting value or more, and v) the rotational angle of the steering wheel is a fourth setting value or more.

On the contrary, even if the vehicle has satisfied the entry condition, the entry condition determinator 210 determines that the entry condition has been released if it is confirmed that the low friction road running mode switch during the running has been in the OFF state, i) the signal delivered from the sensor is an abnormal signal, ii) the engine speed value is smaller than the predetermined first setting value, iii) the engine oil temperature is smaller than the predetermined second setting value, iv) the position of the accelerator pedal is smaller than the predetermined third setting value, or v) the rotational angle of the steering wheel is smaller than the fourth setting value.

Next, after the shift controller 220 serves as requesting the transmission to prohibit the shift so that the current gear of the vehicle may be maintained if the downshift occurs, after it has been determined that the entry condition has been satisfied in the entry condition determinator 210.

Further, the engine torque controller 230 serves as requesting the engine to limit the engine torque to reduce or minimize damage applied to the transmission if the downshift occurs, after it has been determined that the entry condition has been satisfied in the entry condition determinator 210.

More specifically, since the fact that the downshift has occurred means that the wheel locking has occurred by operating the ESP due to the wheel slip, the shift controller 220 and the engine torque controller 230 prohibit the shift and perform the transmission control and the engine control limiting the engine torque only if the downshift occurs, after it has been determined that the entry condition has been satisfied, and if the downshift does not occur even if the entry condition has been satisfied, the wheel slip does not occur, such that the shift controller 220 and the engine torque controller 230 do not perform a separate control.

For example, in a situation where the vehicle satisfies the entry condition and is running in the second gear, i) if the downshift shifted from the second gear to the first gear occurs, as illustrated in FIG. 3, the shift controller 220 may prohibit the shift and the engine torque controller 230 may limit the engine torque, thereby preventing the occurrence of the repetitive shift and reducing or minimizing the shock applied to the transmission, but ii) if the upshift shifted from the second gear to the third gear occurs, there is no possibility that the repetitive shift by the operation of the ESP occurs, such that the shift controller 220 and the engine torque controller 230 do not perform a separate control.

Further, the controller 200 may further include a low friction road running determinator 240 for determining whether the vehicle has escaped the low friction road based on the lateral acceleration value of the vehicle received from the sensor 100.

In particular, the low friction road running determinator 240 may determine that the vehicle has escaped the low friction road if the lateral acceleration value received from the sensor 100 is greater than a predetermined fifth setting value, and determine that the vehicle is still running on the low friction road if the lateral acceleration value is the predetermined fifth setting value or less, and the controller 200 may determine whether to continuously perform the repetitive shift prevention control based on the result determined on the low friction road running determinator 240 even if the entry condition has been satisfied.

At this time, the first setting value, the second setting value, the third setting value, and the fourth setting value, which are a reference of determining the entry condition, and the fifth setting value, which is a reference of determining whether to escape the low friction road mean values that have been determined through the experiment, and then stored in the controller 200, and it is natural that the first setting value, the second setting value, the third setting value, the fourth setting value, and the fifth setting value may be changed according to an embodiment.

Specifically, the controller 200 i) determines whether the downshift occurs only if it is determined that the vehicle has not escaped the low friction road on the low friction road running determinator 240 (that is, the lateral acceleration value≤the fifth setting value), and controls the shift and the engine torque if it is determined that the downshift has occurred, thereby performing the control for preventing the repetitive shift, but ii) does not perform the repetitive shift prevention control because there is no possibility that the repetitive shift not intended by the driver occurs if it is determined that the vehicle has escaped the low friction road on the low friction road running determinator 240 (that is, the lateral acceleration value>the fifth setting value).

Further, the shift controller 220 and the engine torque controller 230 prohibit the shift to prevent the repetitive shift, and stop performing the repetitive shift prevention control if it is determined that the entry condition has been released during the running of the vehicle in the entry condition determinator 210 even if the engine torque is limited.

However, i) the shift controller 220 allows the shift after prohibiting the shift of the transmission so that the current gear may be maintained during a predetermined time, if it is determined that the entry condition has been released during the running of the vehicle in the entry condition determinator 210 as illustrated in FIG. 3, and ii) the engine torque controller 230 controls so that the engine torque may increase at a constant slope during a predetermined time, if it is determined that the entry condition has been released during the running of the vehicle in the entry condition determinator 210, thereby maintaining the repetitive shift prevention control during the predetermined time, and through such a control, even if a case where the entry condition determinator 210 erroneously determines that the entry condition has been temporarily released due to noise occurs, it is possible to prevent the repetitive shift not intended by the driver from occurring during the predetermined time.

Next, a vehicle control method on a low friction road according to another embodiment of the present disclosure will be described with reference to FIG. 4.

Figure 4:
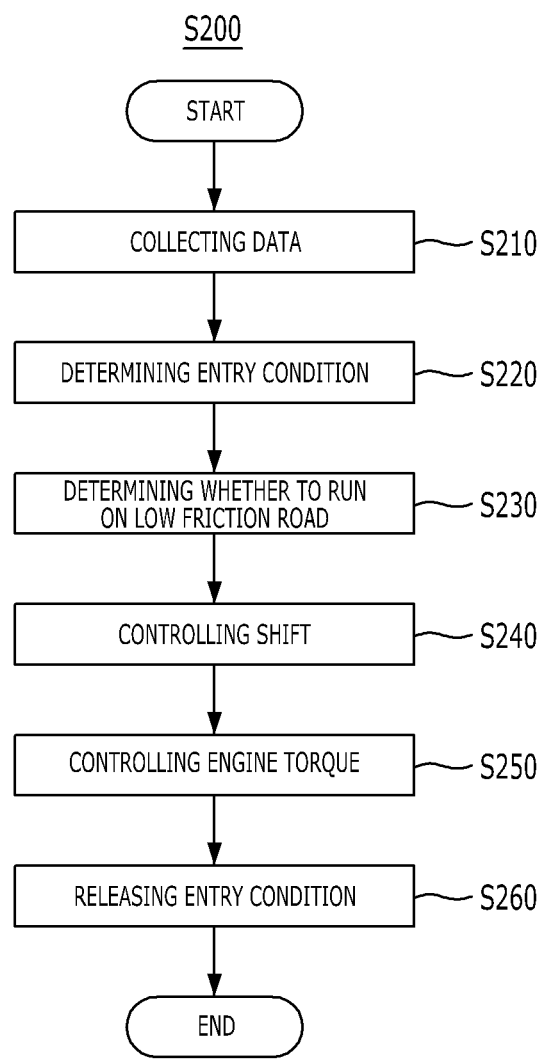
FIG. 4 is a flowchart illustrating a vehicle control method in a low friction road condition.

FIG. 4 is a flowchart of a vehicle control method on a low friction road according to another embodiment of the present disclosure.

In another embodiment of the present disclosure, the present disclosure, in a vehicle control method for preventing the repetitive shift during the running on the low friction road, provides a vehicle control method (operation S200) including collecting data that collects an engine speed of the vehicle, an engine oil temperature, a position of an accelerator pedal, a lateral acceleration of the vehicle, a rotational angle of a steering wheel, or ON/OFF data of the low friction road running mode switch (operation S210), determining an entry condition that determines whether the vehicle has satisfied the entry condition for performing a repetitive shift prevention control or whether the entry condition during the running of the vehicle has been released based on the data collected in the collecting the data (operation S210) (operation S220), controlling the shift that prohibits the shift of a transmission if the downshift occurs, after it has been determined that the entry condition has been satisfied in the determining the entry condition (operation S220) (operation S240), and controlling the engine torque that requests the engine torque limitation if the downshift occurs, if it has been determined that the entry condition has been satisfied in the determining the entry condition (operation S220) (operation S250).

However, since a specific control process of the vehicle control method (operation S200) according to another embodiment of the present disclosure is substantially the same as described above in the vehicle control system on the low friction road according to an embodiment of the present disclosure, a detailed description thereof will be omitted herein.

At this time, the collecting the data (operation S210) may collect the data such as the engine speed of the vehicle, the engine oil temperature, the position of the accelerator pedal, the lateral acceleration of the vehicle, and the rotational angle of the steering wheel through the oil temperature sensor, the accelerator position sensor, the steering angle sensor, the acceleration sensor, and the engine speed sensor as described above.

The step of the determining the entry condition (operation S220) determines that the vehicle has satisfied the entry condition for performing the repetitive shift prevention control, if it is confirmed that the low friction road running mode switch has been in the ON state based on the data collected in the collecting the data (operation S210), i) the data signal collected in the collecting the data (operation S210) is a normal signal, ii) the engine speed value is the predetermined first setting value or more, iii) the engine oil temperature is the predetermined second setting value or more, iv) the position of the accelerator pedal is the predetermined third setting value or more, and v) the rotational angle of the steering wheel is the fourth setting value or more.

Even if the vehicle has satisfied the entry condition, the determining the entry condition (operation S220) determines that the entry condition has been released, if it is confirmed that the low friction road running mode switch has been in the OFF state during the running, i) the data signal collected in the collecting the data (operation S210) is an abnormal signal, ii) the engine speed value is smaller than the predetermined first setting value, iii) the engine oil temperature is smaller than the predetermined second setting value, iv) the position of the accelerator pedal is smaller than the predetermined third setting value, or v) the rotational angle of the steering wheel is smaller than the fourth setting value.

Further, the vehicle control method (operation S200) according to another embodiment of the present disclosure further includes determining whether the vehicle has escaped the low friction road based on the lateral acceleration data of the vehicle collected in the collecting the data, prior to the controlling the shift (operation S240) or the controlling the engine torque (operation S250).

The determining whether to run on the low friction road (operation S230) determines that the vehicle has escaped the low friction road if the lateral acceleration value of the vehicle collected in the collecting the data (operation S210) is greater than a predetermined setting value (the fifth setting value) (i.e., the lateral acceleration value>the fifth setting value), and since it is not necessary to perform the repetitive shift prevention control if the vehicle has escaped the low friction road, the controlling the shift (operation S240) and the controlling the engine torque (operation S250) do not perform a separate control if it has been determined that the vehicle has escaped the low friction road in the determining whether to run on the low friction road (operation S230).

On the contrary, the determining whether to run on the low friction road (operation S230) may determine that the vehicle has not escaped the low friction road if the lateral acceleration value of the vehicle collected in the collecting the data (operation S210) is the predetermined setting value (the fifth setting value) (i.e., the lateral acceleration value≤the fifth setting value), and the controlling the shift (operation S240) and the controlling the engine torque (operation S250) may determine whether the downshift occurs, prohibit the shift if the downshift occurs, and limit the engine torque to prevent the repetitive shift not intended by the driver from occurring.

Further, the vehicle control method (operation S200) according to another embodiment of the present disclosure further includes releasing the entry condition that prohibits the shift of the transmission so that the current gear may be maintained during the running of the vehicle, or controls the engine so that the engine torque may increase at a constant slope during a predetermined time, if it has been determined that the entry condition has been released during the running of the vehicle in the determining the entry condition (operation S210) (operation S260), and may prevent the repetitive shift from occurring during the predetermined time, even if there occurs a case where it is erroneously determined that the entry condition has been released temporarily due to noise in the determining the entry condition (operation S220) through the releasing the entry condition (operation S260).

As described above, although it has been illustrated and described with respect to exemplary embodiments and applications of the present disclosure, the present disclosure is not limited to the specific embodiments and applications described above, it is natural that various modifications may be made by those skilled in the art to which the present disclosure pertains without departing from the gist of the disclosure, and these modifications should not be individually understood from the technical spirit or prospect of the present disclosure.

Further, the terminology used in the present disclosure is merely used for the purpose of describing specific embodiments and is not intended to limit the present disclosure. Singular expressions include plural expressions unless the context clearly indicates otherwise.

The scope of the present disclosure should be construed by the following claims, and all technical spirits within the scope equivalent thereto should be construed as being included in the scope of the present disclosure.

What is claimed is:

1. A vehicle control system for inhibiting repetitive gear shifts while a vehicle is running on a low friction road, the vehicle control system comprising:
   one or more sensors configured to detect an engine speed of the vehicle, a temperature of an engine oil, a position of an accelerator pedal, a lateral acceleration of the vehicle, a rotational angle of a steering wheel, or whether a low friction road running mode switch is turned on or off; and
   a controller configured to:
      receive detected data from the one or more sensors,
      determine whether the vehicle satisfies an entry condition for performing a repetitive shift prevention control based on the received data of the vehicle, and
      control a gear shift of a transmission and an engine torque of the vehicle to perform the repetitive shift prevention control when a downshift occurs in a state where the vehicle has satisfied the entry condition,
   wherein the controller comprises:
   an entry condition determinator configured to determine whether the vehicle has satisfied the entry condition or whether the entry condition has been released during the running of the vehicle based on the data received from the one or more sensors;
   a shift controller configured to inhibit the gear shift of the transmission when the downshift occurs, after the entry condition has been satisfied; and
   an engine torque controller configured to request an engine torque limitation when the downshift occurs, after the entry condition has been satisfied.

2. The vehicle control system of claim 1,
   wherein the one or more sensors comprises:
   an oil temperature sensor configured to detect the temperature of the engine oil;
   an accelerator position sensor configured to detect the position of the accelerator pedal;
   a steering angle sensor configured to detect the rotational angle of the steering wheel;
   an acceleration sensor configured to detect the lateral acceleration of the vehicle; and
   an engine speed sensor configured to detect the engine speed of the vehicle.

3. The vehicle control system of claim 1,
   wherein the entry condition determinator is configured to determine that the vehicle has satisfied the entry condition when:
   the low friction road running mode switch is turned on,
   a signal delivered from the one or more sensors is a normal signal,
   the engine speed is equal to or greater than a predetermined first setting value,
   the temperature of the engine oil is equal to or greater than a predetermined second setting value,
   the position of the accelerator pedal is equal to or greater than a predetermined third setting value, and
   the rotational angle of the steering wheel is equal to or greater than a predetermined fourth setting value.

4. The vehicle control system of claim 1,
   wherein the controller further comprises a low friction road running determinator configured to determine whether the vehicle has escaped the low friction road based on a value of the lateral acceleration of the vehicle, and
   wherein the low friction road running determinator is configured to determine that the vehicle has escaped the low friction road when the value of the lateral acceleration is greater than a predetermined fifth setting value.

5. The vehicle control system of claim 4, wherein the controller is configured to determine whether the downshift occurs only when it is determined that the vehicle has not escaped the low friction road, and configured to control the gear shift of the transmission and the engine torque when the downshift has occurred.

6. The vehicle control system of claim 1, wherein the shift controller is configured to inhibit the gear shift of the transmission such that a current gear is maintained during a predetermined time, when the entry condition determinator determines that the entry condition has been released during the running of the vehicle.

7. The vehicle control system of claim 1, wherein the engine torque controller is configured to control the engine torque to be increased with a constant slope during a predetermined time, when the entry condition has been released during the running of the vehicle.

8. A vehicle control method for inhibiting repetitive gear shifts of a vehicle while running on a low friction road, the vehicle control method comprising:
  collecting, by at least one sensor, data of the vehicle including at least one of an engine speed of the vehicle, a temperature of an engine oil, a position of an accelerator pedal, a lateral acceleration of the vehicle, a rotational angle of a steering wheel, or ON/OFF data of a low friction road running mode switch;
  determining, by a controller, whether the vehicle satisfies an entry condition for performing a repetitive shift prevention control or whether the entry condition has been released during the running of the vehicle based on the collected data;
  inhibiting, by the controller, a gear shift of a transmission of the vehicle when a downshift occurs after it has been determined that the entry condition has been satisfied; and
  controlling, by the controller, an engine to limit an engine torque when the downshift occurs after it has been determined that the entry condition has been satisfied.

9. The vehicle control method of claim 8, further comprising: prior to controlling the gear shift of the transmission or the engine torque, determining, by the controller, whether the vehicle has escaped the low friction road based on the lateral acceleration data of the vehicle.

10. The vehicle control method of claim 9, wherein determining that the vehicle has escaped the low friction road when a value of the lateral acceleration of the vehicle is greater than a predetermined setting value.

11. The vehicle control method of claim 8, further comprising: when the entry condition has been released during the running of the vehicle, inhibiting the gear shift of the transmission such that a current gear is maintained during a predetermined time, or controlling the engine torque to be increased with a constant slope during a predetermined time.

* * * * *